United States Patent

[11] 3,593,878

| | | |
|---|---|---|
| [72] | Inventor | Siegfried Hertell<br>Kelsterbach, Germany |
| [21] | Appl. No. | 866,296 |
| [22] | Filed | Oct. 14, 1969 |
| [45] | Patented | July 20, 1971 |
| [73] | Assignee | International Telephone and Telegraph Corporation<br>New York, N.Y. |
| [32] | Priority | Oct. 19, 1968 |
| [33] | | Germany |
| [31] | | P 18 04 036.3 |

[54] CYLINDRICAL PRESSURE VESSEL AND COVER
7 Claims, 2 Drawing Figs.

[52] U.S. Cl..................................................... 220/55,
292/256.6
[51] Int. Cl....................................................... A47j 27/08,
A47j 36/10, B65d 45/00
[50] Field of Search........................................... 220/55, 46;
292/256.6

[56] References Cited
UNITED STATES PATENTS
| | | | |
|---|---|---|---|
| 2,665,877 | 1/1954 | MacGregor............. | 220/55 X |
| 3,429,476 | 2/1969 | Hunter................... | 220/55 |

*Primary Examiner*—George T. Hall
*Attorneys*—C. Cornell Remsen, Jr., Walter J. Baum and Paul W. Hemminger

ABSTRACT: A cover for cylindrical pressure vessels wherein the cylindrical cover having a reduced diameter section at the end extends into the cylinder. A prop ring having a tubular section is positioned between the reduced diameter part of the cover and the cylinder for alignment and support of the cover with respect to the cylinder axis. A radial flange on the prop ring extends into a groove in the cylinder wall to position the cover longitudinally along the axis of the cylinder and prevent the cover from moving outward.

Inventor
Siegfried Hertell
By Gennaro L Pasquale
Agent

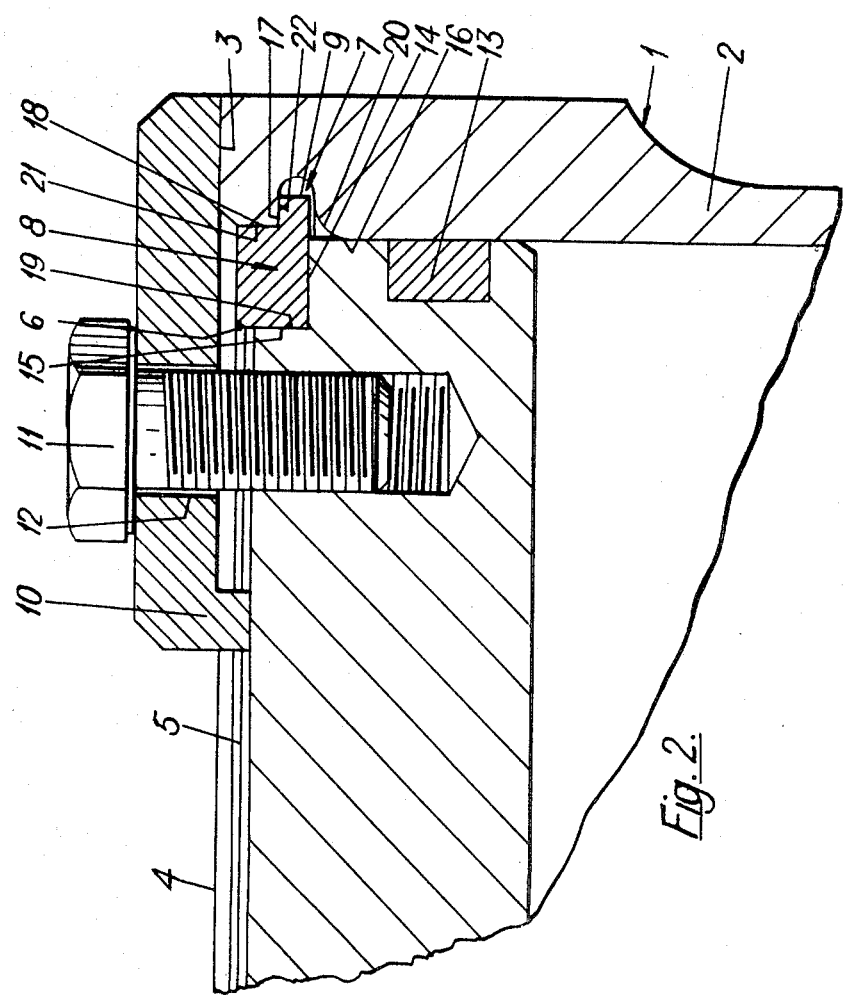

CYLINDRICAL PRESSURE VESSEL AND COVER

CROSS REFERENCE TO RELATED APPLICATION

This application is filed under the provisions of 35 USC 119 with a claim for the benefit of the filing date of an application covering the same invention filed on Oct. 19, 1968 Ser. No. P 18 04 036.3 in the Federal Republic of Germany.

BACKGROUND OF THE INVENTION

The invention relates to means for attaching end covers to cylinders.

Obtaining a tight connection between a cylindrical pressure vessel and its cover is difficult, especially as the pressure within the vessel increases. When the cover must be absolutely concentric and perpendicular to the cylinder, such as when the cover is a guide and support for a piston rod of a differential area piston passing through the cover, the connection requirements become even more critical.

A conventional method to meet such requirements is to use snap rings which are supported between an annular slot in the cover and a corresponding annular slot in the cylinder wall. However, this construction does not insure that the cover is perpendicular to the cylinder.

SUMMARY OF THE INVENTION

An object of the present invention is to provide attachment means for a cover for a cylindrical pressure tank which insures that the cover will be concentric and perpendicular with respect to the cylinder even when the pressure tank is under high pressure.

This and other objects which will become apparent hereinafter are attained in accordance with the present invention by a disclike cover which fits within the cylinder and which has a smaller diameter in front forming an annular shoulder on the disc. The cylinder has an annular slot and a retainer, or prop ring, inserted between the annular slot and shoulder which prevents the cover from moving outward. The retainer, or prop ring, has an axially extending section which fits closely against the reduced diameter portion of the cover and the cylinder wall to position the cover concentrically with the cylinder and to hold the cover perpendicular with respect to the cylinder. The axially extending section or flange on the retainer ring is essentially a closely fitting cylindric supporting member between the cover and the cylinder. The ring which has a L-shaped cross section may be one piece or made from separate arcuate sections.

To prevent the cover from moving into the cylinder, radially extending claws or fingers attached to the cover by means of screws extend over the end of the cylinder.

BRIEF DESCRIPTION OF THE DRAWINGS

FIG. 2 is an enlarged cross section of part of FIG. 1 showing the means for attaching the cover to the cylindrical housing.

DESCRIPTION OF THE PREFERRED EMBODIMENT

Figure 1:
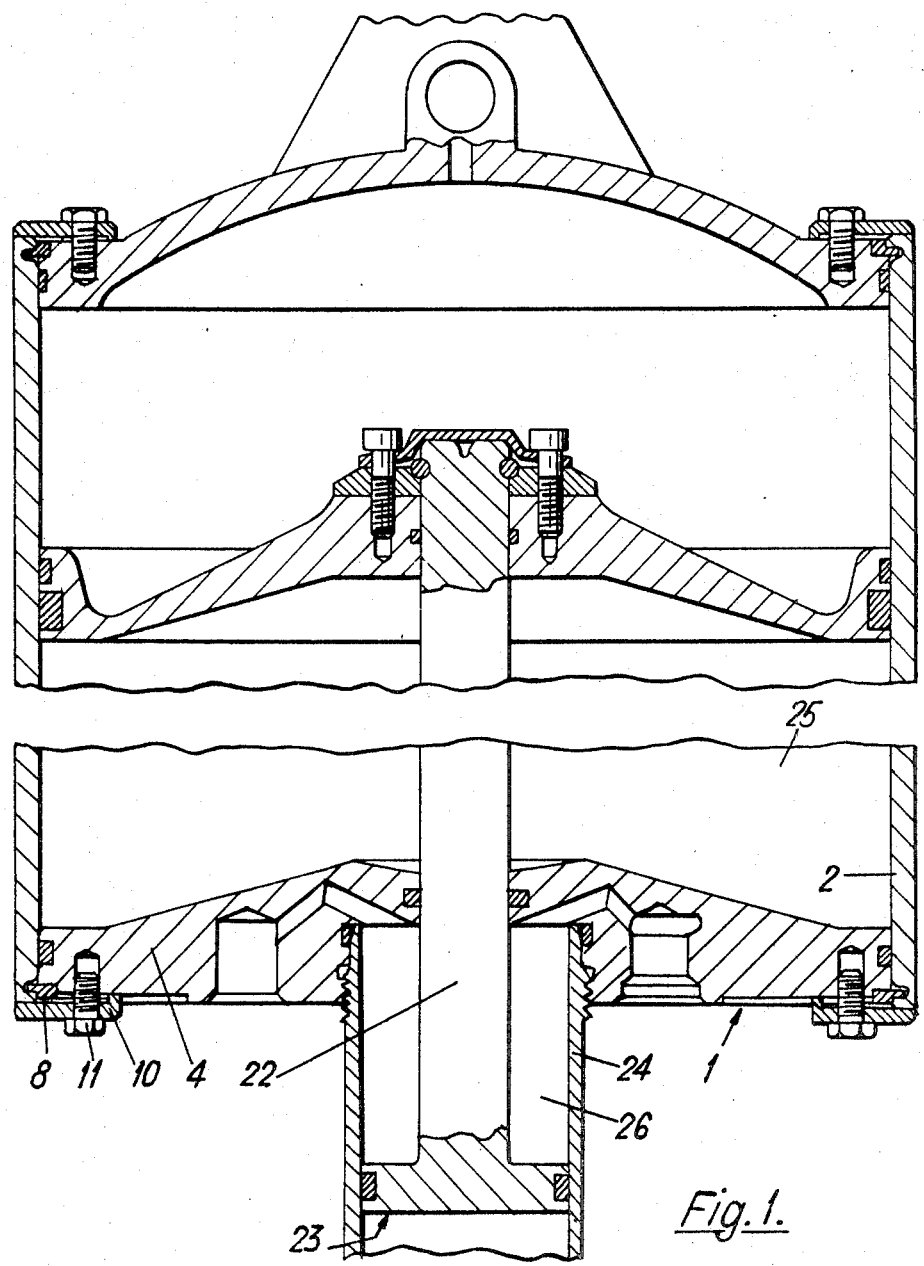
FIG. 1 is a cylindrical pressure tank with a stepped differential area piston extending through the cover into the tank.

The pressure tank 1, a part of which is represented in FIGS. 1 and 2, essentially comprises a cylindrical housing 2 and a cover 4 mounted to the housing by means of a retainer, or prop ring, 8 with claws 10 and screws 11 passing through the claws. The piston rod 22 of a stepped piston 23 extends through one of the two covers 4. In this way a statically indeterminate support of the stepped piston 23 results from the cylinder walls 24 and 2 of the low pressure chamber 25 and the high pressure chamber 26, on the one hand, and the bushing in the cover 4, on the other hand. An annular slot or shoulder 6 cut into the cover 4 on its front face 5 is provided to bear the prop ring 8. The slot extends in a radial direction to the guiding surface 16 of tee cover. This results in the smooth faces 14 and 15. The face or surface 15 is cylindrical about the same axis as the cover and the surface 14 is a plane surface perpendicular to the axis of the cover.

The prop ring 8 may be made in one piece or from several segments and has an L-shaped cross section, the radially inner part with its smooth faces 19 and 20 lies against the corresponding smooth faces 14 and 15 of the annular slot 6 in the cover 4.

The radially outer part of the prop ring 8 which is inserted with its radial extension 9 in an annular slot 7 in the cylinder wall 2 comes to lie with its smooth faces 21 and 22 against corresponding smooth faces 17 and 18 in the cylinder wall 2.

Hence, this prop ring 8 provides a self-centering, nontilting guide for the cover 4 in the cylinder housing 2 by the parallel smooth faces 19 and 21 and a holding effect by the faces 20 and 22 to prevent the cover from slipping out.

Simultaneously, the smooth wall 21 precludes the prop ring 8 from advancing further into the annular slot 7 in the cylinder wall 2.

The inner diameter of the cylinder wall 2 is larger outward of the annular slot 7 than inward, so that the part of the prop ring 8 extending into the slot will not be sheared off when the cover is attached to the cylinder.

To prevent the cover 4 from falling into the cylinder housing, several claws 10 are provided which rest on the cover front face 5 and the cylinder front face 3. Screws 11 pass through holes 12 in each claw and are screwed into the cover 4 to press it against the plane face 20 of the prop ring 8, on the one hand, and the plane face 17 of the cylinder wall 2, on the other hand.

It will be appreciated that the invention illustrated and described herein may be modified by those skilled in the art without deviating from the spirit and scope of the invention as set forth in the following claims.

I claim as my invention:

1. In combination, a housing having a cylindrical pressure chamber therein, the cylindrical chamber having an annular groove in its wall adjacent the end of the cylinder, a discoid cover in the end of the cylinder, the outer end of the cover having a reduced diameter section forming a shoulder, and a prop ring for positioning the cover, the prop ring having a tubular section which fits between the reduced diameter section of the cover and the cylinder wall for aligning the cover with respect to the cylinder axis and a radially extending flange fitting into the annular groove in the cylinder to prevent the cover from moving outward.

2. The combination of claim 1 wherein the sides of the annular groove in the cylinder, the shoulder on the cover, and the flange on the prop ring are all perpendicular to the axis of the cylinder.

3. The combination of claim 2 wherein the prop ring has an L-shaped cross section.

4. The combination of claim 1 wherein the cover is prevented from moving inward by radially extending members attached to the cover and extending outward over the end of the cylinder.

5. The combination of claim 1 wherein the prop ring is formed from several parts.

6. The combination of claim 4 wherein the radially extending members are attached to the cover by means of bolts passing through holes in the members.

7. The combination of claim 2 wherein the cover is prevented from moving inward by radially extending members attached to the cover and extending outward over the end of the cylinder.